United States Patent
Okada et al.

(10) Patent No.: US 8,017,800 B2
(45) Date of Patent: Sep. 13, 2011

(54) ADAMANTYL GROUP-CONTAINING EPOXY-MODIFIED (METH)ACRYLATE AND RESIN COMPOSITION CONTAINING THE SAME

(75) Inventors: Yasunari Okada, Chiba (JP); Hajime Ito, Chiba (JP); Hideki Yamane, Chiba (JP); Nobuaki Matsumoto, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/831,763

(22) Filed: Jul. 7, 2010

(65) Prior Publication Data

US 2010/0274043 A1 Oct. 28, 2010

Related U.S. Application Data

(62) Division of application No. 12/298,260, filed as application No. PCT/JP2007/058795 on Apr. 24, 2007, now Pat. No. 7,790,917.

(30) Foreign Application Priority Data

Apr. 28, 2006 (JP) ................................ 2006-125455

(51) Int. Cl.
$C07C\ 69/732$ (2006.01)
(52) U.S. Cl. ....................................... 560/194; 549/560
(58) Field of Classification Search .................. 560/194; 549/560
See application file for complete search history.

(56) References Cited

U.S. PATENT DOCUMENTS 6,066,711 A 5/2000 Hanazawa et al.

FOREIGN PATENT DOCUMENTS

| JP | 4 39665 | 2/1992 |
|---|---|---|
| JP | 6 305044 | 11/1994 |
| JP | 8 286371 | 11/1996 |
| JP | 9 302077 | 11/1997 |
| JP | 10 130371 | 5/1998 |
| JP | 10130371 A * | 5/1998 |
| JP | 2002 220425 | 8/2002 |
| JP | 2002220425 A * | 8/2002 |
| JP | 2002 341533 | 11/2002 |
| JP | 2004 083855 | 3/2004 |
| JP | 2004083855 A * | 3/2004 |
| JP | 2006 307062 | 11/2006 |
| JP | 2006 348064 | 12/2006 |

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The present invention provides an adamantyl group containing epoxy-modified (meth)acrylate and a resin composition containing it which are imparted by transparency, optical characteristics such as (durable) light resistance and the like, heat-resistance, and good mechanical properties.

For example, they are an adamantyl group containing epoxy-modified (meth)acrylate having the following general formula (I) and a composition containing it. In the formula, $R^1$ represents a hydrogen atom or a methyl group, and $R^2$ represents a halogen atom or an aliphatic hydrocarbon group which may contain a hetero atom. Plural $R^2$ may be the same or different, and m represents an integer of 0 to 4 and n represents an integer of 0 or more.

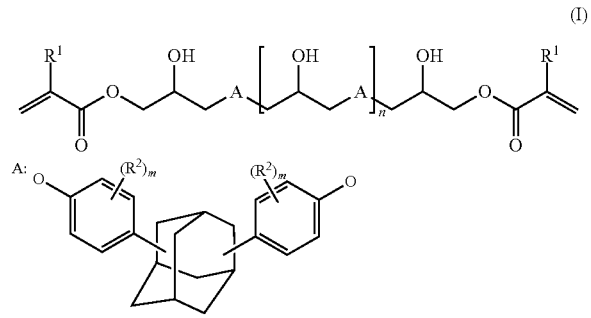

12 Claims, No Drawings

ADAMANTYL GROUP-CONTAINING EPOXY-MODIFIED (METH)ACRYLATE AND RESIN COMPOSITION CONTAINING THE SAME

CROSS REFERENCE TO RELATED APPLICATION

This application is a divisional of U.S. application Ser. No. 12/298,260, filed on Oct. 23, 2008, which is a 371 of PCT/JP07/058795, filed on Apr. 24, 2007, and claims priority to Japanese Patent Application No. 2006-125455, filed on Apr. 28, 2006.

TECHNICAL FIELD

The present invention relates to a novel adamantyl group containing epoxy-modified (meth)acrylate having excellent transparency, heat-resistance, and mechanical properties, and to a resin composition containing the compound.

BACKGROUND ART

An adamantane contains 4 cyclohexane rings condensed to form a cage skeleton, and is a highly symmetric and stable compound. Derivatives thereof show specific performances, thus are known to be useful as raw materials for a pharmaceutical raw material, a high performance industrial material and the like. An adamantane has, for example, optical characteristics, heat resistance and the like, and therefore attempts have been made to use it for an optical disk substrate, an optical fiber, a lens and the like (for example, refer to Patent Documents 1 and 2). Further, there have been attempts to use an adamantane ester as a raw resin material for a photoresist by utilizing its acid-sensitive property, dry etching resistance, UV light transparency and the like (for example, refer to Patent Document 3).

In recent years, in the field of an electronic and an optical material, studies are progressing for higher performance/improvement of an optical/electronic component, such as for higher precision, wider viewing angle, and enhanced image quality of a flat panel display using a liquid crystal, an organic electroluminescence (EL) device and the like, for higher intensity, shorter wavelength and whitening of a light source using such optical semiconductors as a light emitting diode (LED) and the like, and further for higher frequency of an electronic circuit and for an optical circuit/communication, and others.

In addition, the progress in the technical field of semiconductors is remarkable, and electronic instruments are rapidly moving toward further miniaturization and weight reduction, high performance, and multi-functionalization. In accordance with such progress, a wiring board is required to have higher density and more wiring.

On the other hand, an epoxy acrylate resin is used for various kinds of coating material, a construction material, a solder resist of a wiring board, a protection film for a color filter of a liquid crystal display and an image sensor, a color resist, and the like. With regard to the solder resist, a bisphenol A epoxy acrylate resin was disclosed (for example, refer to Patent Document 4). Further, as a light-sensitive composition for a color filter, a cresol novolak epoxy acrylate resin was disclosed (for example, refer to Patent Document 5). However, these epoxy acrylate resins have limits in transparency, (durable) heat-resistance, and (durable) light-resistance, and therefore a material satisfying those requirements has been desired. When an epoxy acrylate resin is used for a solder resist or a material relating to a liquid crystal display, it is often used as a radiation-sensitive resin composition comprising it. In this case, if the transparency of the resin composition is insufficient, only an exposed surface is cured, thereby leading to a problem not to obtain a cured product having good mechanical properties.

Furthermore, in an electronic circuit integrated with a semiconductor and the like, as a computerized society progresses, the increase in volume of information and communication speed and the miniaturization of a device are progressing, thus further miniaturization, integration, and an increase in frequency of the circuit are necessary. Moreover, an optical circuit using an optical waveguide and the like that enable further high speed processing has also been investigated. In those uses, such conventional resins as a bisphenol A epoxy resin and the like have been used as a sealing resin, an adhesive resin, a film, or a resin for a lens. However, the bisphenol A epoxy resin and the like have problems such as a high dielectric constant, insufficient heat resistance and the like in an electronic circuit, a decrease in transparency, yellowing of a resin due to decaying and the like in an optical waveguide and an LED sealant, and others.

Patent Document 1: Japanese Patent Laid-Open Publication No. H6-305044
Patent Document 2: Japanese Patent Laid-Open Publication No. H9-302077
Patent Document 3: Japanese Patent Laid-Open Publication No. H4-39665
Patent Document 4: Japanese Patent Laid-Open Publication No. H8-286371
Patent Document 5: Japanese Patent Laid-Open Publication No. 2002-341533

DISCLOSURE OF THE INVENTION

Problems to be Solved by the Invention

In view of the above-mentioned circumstances, an object of the present invention is to provide an adamantyl group containing epoxy-modified (meth)acrylate and a resin composition containing it which have excellent transparency, optical characteristics such as (durable) light resistance and the like, heat resistance, and good mechanical properties, suitable as a solder resist for a wiring board, a protection film for a color filter of a liquid crystal display and an image sensor, a color resist, an interlayer insulation film for a liquid crystal display, a sealant for an electronic circuit (a sealant for an optical semiconductor and for an organic EL device), an optoelectronic component (an optical waveguide, a lens for an optical communication, an optical film, and the like), an adhesive for them, and the like. Here, a (meth)acrylate indicates an acrylate or a methacrylate.

Means for Solving the Problems

The present inventors investigated extensively, and as a result, found that a resin composition giving a cured product suitable as an optoelectronic component and the like was obtained by using a specific adamantyl group containing epoxy-modified (meth)acylate. The present invention was accomplished based on this finding.

Namely, the present invention provides a following adamantyl group containing epoxy-modified (meth)acrylate, a method for producing it, and a resin composition containing it.

1. An adamantyl group containing epoxy-modified (meth)acrylate represented by the general formula (I).

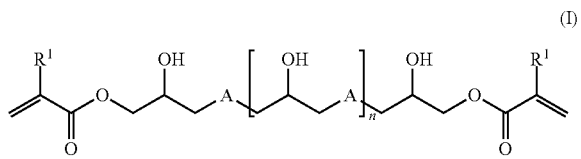

(I)

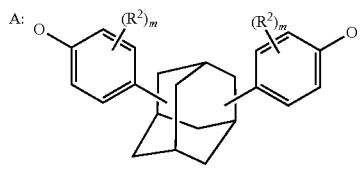

[In the formula, $R^1$ represents a hydrogen atom or a methyl group, $R^2$ represents a halogen atom or an aliphatic hydrocarbon group which may contain a hetero atom. Plural $R^2$ may be the same or different. Here, m represents an integer of 0 to 4 and n represents an integer of 0 or more.]

2. An adamantyl group containing epoxy-modified (meth)acrylate represented by the general formula (II).

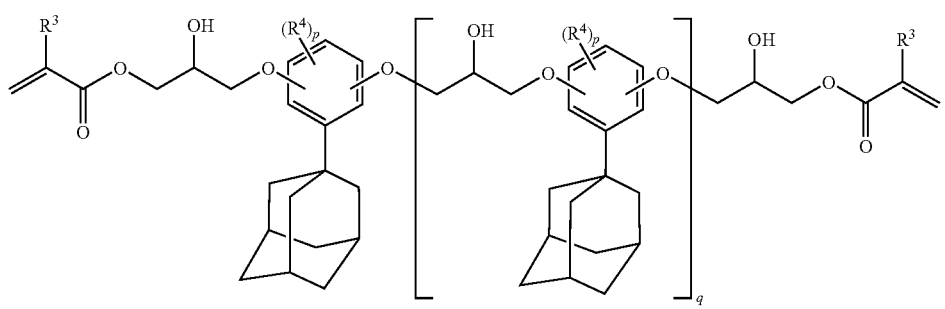

(II)

[In the formula, $R^3$ represents a hydrogen atom or a methyl group, $R^4$ represents a halogen atom or an aliphatic hydrocarbon group which may contain a hetero atom. Plural $R^4$ may be the same or different. Here, p represents an integer of 0 to 3 and q represents an integer of 0 or more.]

3. An adamantyl group containing epoxy-modified (meth)acrylate represented by the general formula (III).

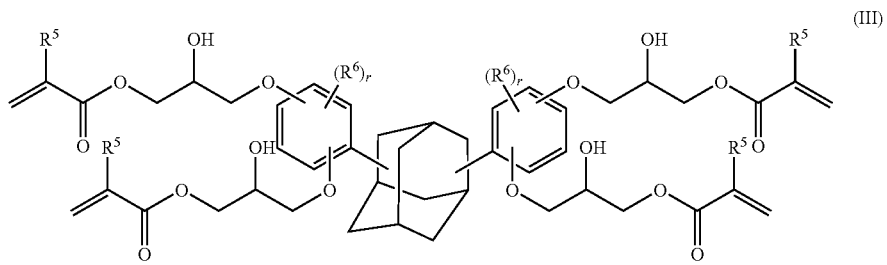

(III)

[In the formula, $R^5$ represents a hydrogen atom or a methyl group, $R^6$ represents a halogen atom or an aliphatic hydrocarbon group which may contain a hetero atom. Plural $R^6$ may be the same or different. Here, r represents an integer of 0 to 3.]

4. A method for producing an adamantyl group containing epoxy-modified (meth)acrylate represented by the general formula (I), comprising reacting an adamantyl group containing epoxy compound represented by the general formula (IV) and (meth)acrylic acid.

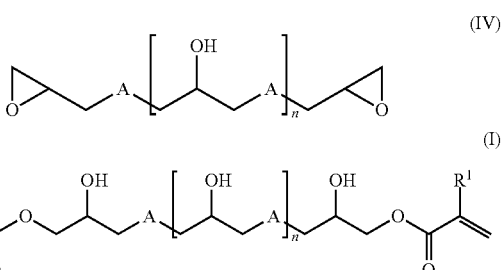

(IV)

(I)

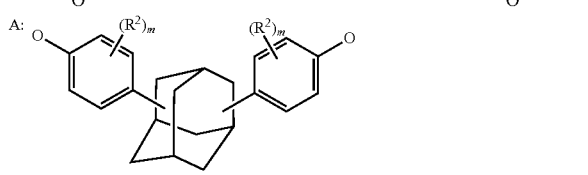

[In the formula, $R^1$, $R^2$, m, and n represent the same as the above-mentioned.]

5. A method for producing an adamantyl group containing epoxy-modified (meth)acrylate represented by the general formula (II), comprising reacting an adamantyl group containing epoxy compound represented by the general formula (V) and (meth)acrylic acid.

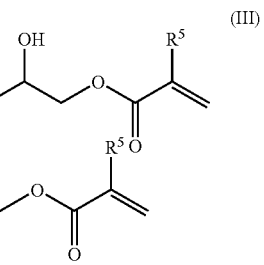

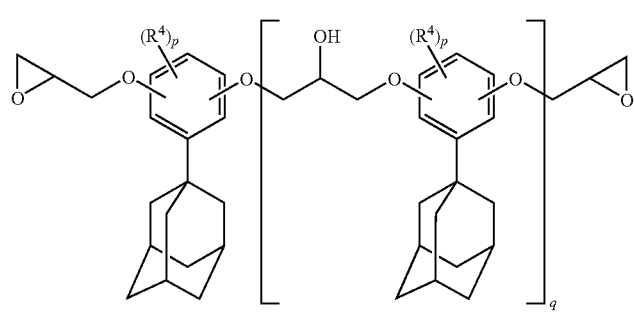

(V)

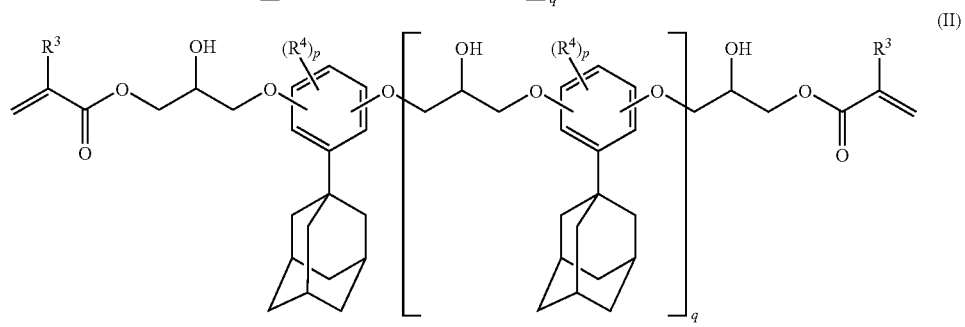

(II)

[In the formula, $R^3$, $R^4$, p, and q represent the same as the above-mentioned.]

6. A method for producing an adamantyl group containing epoxy-modified (meth)acrylate represented by the general formula (III), comprising reacting an adamantyl group containing epoxy compound represented by the general formula (VI) and (meth)acrylic acid.

Best Mode for Carrying out the Invention

An adamantyl group containing epoxy-modified (meth)acrylate of the present invention is represented by the following general formulae (I) to (III).

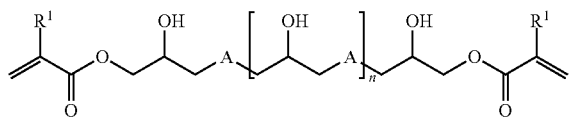

(I)

-continued

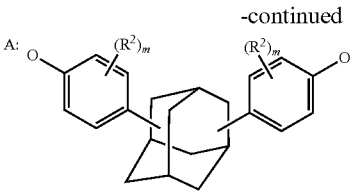

[In the formula, $R^1$ represents a hydrogen atom or a methyl group, $R^2$ represents a halogen atom or an aliphatic hydrocarbon group which may contain a hetero atom. Plural $R^2$ may be the same or different. Here, m represents an integer of 0 to 4 and n represents an integer of 0 or more.]

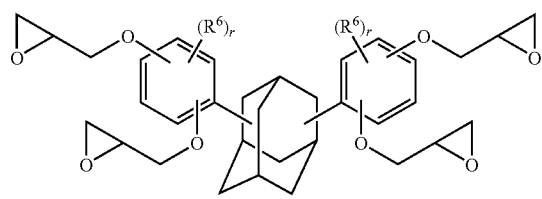

(VI)

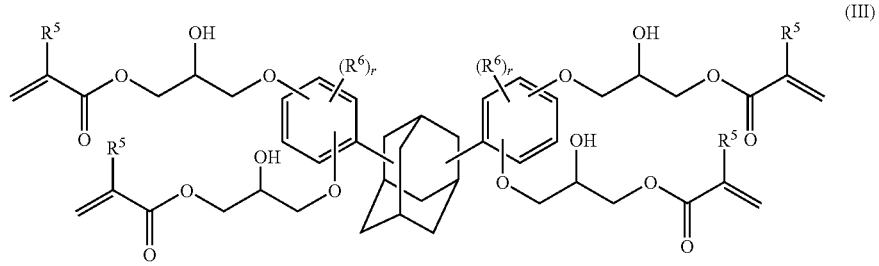

(III)

[In the formula, $R^5$, $R^6$, and r represent the same as the above-mentioned.]

7. A resin composition comprising the adamantyl group containing epoxy-modified (meth)acrylate according to any of the above 1 to 3.

Effect of the Invention

An adamantyl group containing epoxy-modified (meth) acrylate and a resin composition containing it in the present invention give a cured product having excellent transparency, optical characteristics such as (durable) light resistance and the like, (durable) heat resistance, and mechanical properties, suitable as a solder resist for a wiring board, a protection film for a color filter of a liquid crystal display and an image sensor, a color resist, a sealant for an electronic circuit (a sealant for an optical semiconductor and for an organic EL device), an optoelectronic component (an optical waveguide, a lens for an optical communication, an optical film, and the like), an adhesive for them, and the like.

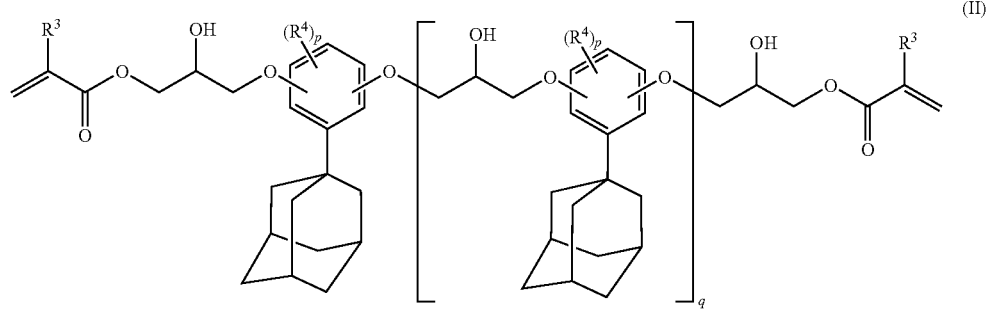

(II)

[In the formula, $R^3$ represents a hydrogen atom or a methyl group, $R^4$ represents a halogen atom or an aliphatic hydrocarbon group which may contain a hetero atom. Plural $R^4$ may be the same or different. Here, p represents an integer of 0 to 3 and q represents an integer of 0 or more.]

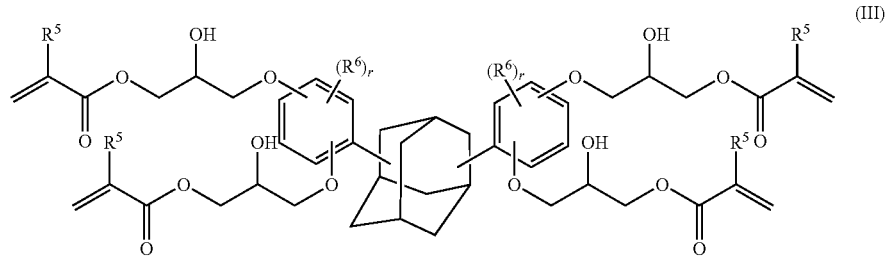

(III)

[In the formula, $R^5$ represents a hydrogen atom or a methyl group, $R^6$ represents a halogen atom or an aliphatic hydrocarbon group which may contain a hetero atom. Plural $R^6$ may be the same or different. Here, r represents an integer of 0 to 3.]

In the general formulae (I) to (III), as the halogen atom represented by $R^2$, $R^4$, or $R^6$, there may be mentioned fluorine, chlorine, bromine, and iodine. As the aliphatic hydrocarbon group which may contain a hetero atom, there may be mentioned a methyl group, an ethyl group, a butyl group, a t-butyl group, a cyclohexyl group, a methoxy group, an ethoxy group, a buthoxy group, a hydroxymethyl group, a hydoxyethyl group, a methylthio group, an ethylthio group, a methylamino group, a dimethylamino group, an ethylamino group, a diethylamino group, and the like.

The adamantyl group containing epoxy-modified (meth) acrylate represented by the general formula (I) may be obtained by reacting an adamantyl group containing epoxy compound represented by the general formula (IV) and (meth)acrylic acid.

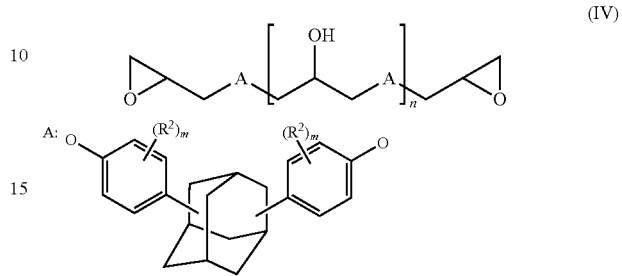

(IV)

In the general formula (V), $R^2$, m, and n are the same as those in the general formula (I). As the adamantyl group containing epoxy compound represented by the general formula (IV), there may be mentioned 1,3-bis(4-glycidyloxyphenyl)adamantane, 1,3-bis(4-glycidyloxy-3-methylphenyl)adamantane, 1,3-bis(4-glycidyloxy-3,5-dimethylphenyl) adamantane, 2,2-bis(4-glycidyloxyphenyl)adamantane, 2,2-bis(4-glycidyloxy-3-methylphenyl)adamantane, 2,2-bis(4-glycidyloxy-3,5-dimethylphenyl)adamantane, and the like.

The adamantyl group containing epoxy-modified (meth) acrylate represented by the general formula (II) may be obtained by reacting an adamantyl group containing epoxy compound represented by the general formula (V) and (meth) acrylic acid.

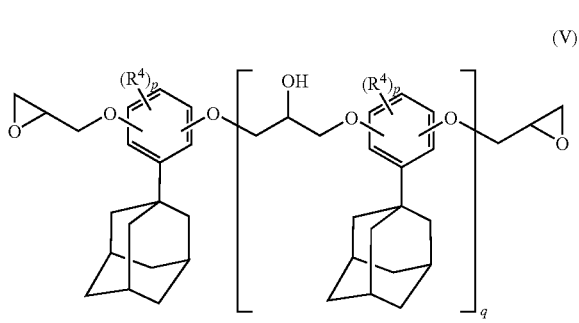

(V)

In the general formula (IV), $R^4$, p, and q are the same as those in the general formula (II). As the adamantyl group containing epoxy compound represented by the general formula (V), there may be mentioned 1-(2,3-diglycidyloxyphenyl)adamantane, 1-(2,4-diglycidyloxyphenyl)adamantane, 1-(2,5-diglycidyloxyphenyl)adamantane, 1-(2,6-diglycidyloxyphenyl)adamantane, 1-(3,4-diglycidyloxyphenyl)adamantane, and the like.

The adamantyl group containing epoxy-modified (meth)acrylate represented by the general formula (III) may be obtained by reacting an adamantyl group containing epoxy compound represented by the general formula (VI) and (meth)acrylic acid.

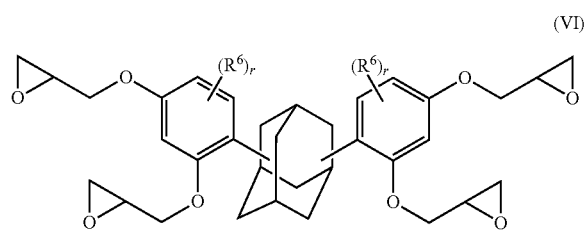

(VI)

In the general formula (VI), $R^6$ and r are the same as those in the general formula (III). As the adamantyl group containing epoxy compound represented by the general formula (VI), there may be mentioned 1,3-bis(2,3-diglycidyloxyphenyl)adamantane, 1,3-bis(2,4-diglycidyloxyphenyl)adamantane, 1,3-bis(2,5-diglycidyloxyphenyl)adamantane, 1,3-bis(2,6-diglycidyloxyphenyl)adamantane, 1,3-bis(3,4-diglycidyloxyphenyl)adamantane, 2,2-bis(2,3-diglycidyloxyphenyl)adamantane, 2,2-bis(2,4-diglycidyloxyphenyl)adamantane, 2,2-bis(2,5-diglycidyloxyphenyl)adamantane, 2,2-bis(2,6-diglycidyloxyphenyl)adamantane, 2,2-bis(3,4-diglycidyloxyphenyl)adamantane, and the like.

The reactions are carried out usually at a temperature of about 50 to about 200° C., and preferably at 70 to 150° C. When the reaction temperature is 50° C. or higher, the reaction rate does not decrease and remains moderate, thus the reaction time is shortened. When the reaction temperature is 200° C. or lower, a side reaction does not take place and the coloring of a product may be suppressed. Applied absolute pressure at the reaction is about 0.01 to about 10 MPa, and preferably normal pressure to 1 MPa. When the reaction pressure is 10 MPa or lower, special equipment is not necessary as the safety is secured, thus it is useful from an industrial viewpoint. The reaction time is usually about 1 to about 50 hours, and preferably 1 to 30 hours.

The reactions are usually carried out in the presence of a catalyst. Examples of the catalyst include organic amines such as triethylamine, tributylamine, pyridine, dimethylaminopyridine, and the like; quaternary ammonium salts such as tetramethylammonium chloride, tetramethylammonium bromide, tetraethylammonium chloride, tetraethylammonium bromide, and the like; and triphenylphospine, and others.

The amount of the catalyst to be used is usually about 0.01 to about 20% by mass, and preferably 0.05 to 15% by mass, relative to the total amount of an adamantyl group containing epoxy compound respectively represented by the general formulae (IV) to (VI) and (meth)acrylic acid.

The reactions are carried out in the absence or presence of a solvent. As the solvent, a solvent having 0.5% by mass or more, and preferably 5% by mass or more of solubility of the adamantyl group containing epoxy compound respectively represented by the general formulae (IV) to (VI) in it is advantageously used. The amount of the solvent to be used is such that the concentration of the adamantyl group containing epoxy compound in it is 0.5% by mass or more, and preferably 5% by mass or more. Here, the adamantyl group containing epoxy compound may exist in the state of suspension but preferably in the state of solution. Specific examples of the solvents include cyclohexane, methylcyclohexane, ethylcyclohexane, toluene, xylene, MEK (methyl ethyl ketone), MIBK (methyl iso-butyl ketone), DMF (dimethylformamide), NMP (N-methyl-2-pyrrolidone), DMAc (N,N-dimethylacetamide), DMSO (dimethylsulfoxide), propyleneglycol monomethyl ether acetate, and the like. These may be used singly or in a combination of two or more kinds.

In the reactions, polymerization inhibitors such as hydroquinone, methoquinone, phenothiazine, methoxyphenothiazine, and the like may be added if necessary. The amount of the polymerization inhibitor to be used is usually about 10 to about 10,000 ppm by mass, and preferably 50 to 5,000 ppm by mass relative to (meth)acrylic acid.

A reaction product may be purified by distillation, crystallization, column-separation and the like, and the purification method may be selected depending on the nature of the reaction product and the kind of an impurity.

A resin composition of the present invention contains an adamantyl group containing epoxy-modified (meth)acrylate represented by the general formulae (I) to (III) respectively. In the resin composition of the present invention, a resin mixture comprising the adamantyl group containing epoxy-modified (meth)acrylate and other polymerizable monomer may be used as far as transparency, heat-resistance, and the like of it are not adversely affected. Examples of other polymerizable monomers include, for instance, methyl (meth)acrylate, ethyl (meth)acrylate, propyl (meth)acrylate, butyl (meth)acrylate, cyclohexyl (meth)acrylate, dicyclopentanyl (meth)acrylate, 1-adamantyl (meth)acrylate, ethyleneglycol di(meth)acrylate, 1,3-propanediol di(meth)acrylate, 1,4-butanediol di(meth)acrylate, pentaerythritol tri(meth)acrylate, pentaerythritol tetra(meth)acrylate, dipentaerythritol penta (meth)acrylate, dipentaerythritol hexa(meth)acrylate, trimethylolpropane tri(meth)acrylate, ditrimethylolpropane tetra (meth)acrylate, and the like. These may be used singly or in a combination of two or more kinds.

Further, in the resin composition of the present invention, a resin mixture comprising the adamantyl group containing epoxy-modified (meth)acrylate and an epoxy resin-modified (meth)acrylate obtained by reacting the following epoxy resin and (meth)acrylic acid may be used. Examples of the epoxy resins include, for example, a bisphenol A epoxy resin, a bisphenol F epoxy resin, a bispheol S epoxy resin, a bispheol AD epoxy resin, a hydrogenated bispheol A epoxy resin, a bispheol G epoxy resin, and a tetramethylbispheol A epoxy resin; fluorine-containing epoxy resins such as a bisphenol AF epoxy resin; glycidylether-type epoxy resins such as a bisphenol C epoxy resin and the like; novolak epoxy resins such as a phenol novolak epoxy resin, a cresol novolak epoxy resin, and the like; an alicyclic epoxy resin; nitrogen-containing cyclic epoxy resins such as triglycidyl isocyanurate, a hydantoin epoxy resin, and the like; an aliphatic epoxy resin; a biphenyl type epoxy resin and a dicyclo type cyclic epoxy resin which are in a mainstream of the type of a low water-absorptive cured body; a naphthalene type epoxy resin; polyfunctional epoxy resins such as trimethylolpropane polyglycidyl ether, glycerol polyglycidyl ether, pentaerythritol polyglycidyl ether, and the like; and others. These may be used singly or in a combination of two or more kinds.

In the resin mixture comprising an adamantyl group containing epoxy-modified (meth)acrylate respectively represented by the general formulae (I) to (III) and the other polymerizable monomer and/or an epoxy resin-modified (meth)acryate mentioned above, the content of the adamantyl group containing epoxy-modified (meth)acrylate is preferably 5% by mass or more, and more preferably 10% by mass or more. When the content of the adamantyl group containing epoxy-modified (meth)acrylate is 5% or more by mass, optical characteristics, a long-term heat-resistance, and electric characteristics of the resin composition of the present invention may become sufficient.

A resin composition of the present invention may be cured by polymerization using a thermal polymerization initiator and/or a photo-polymerization initiator. As the thermal polymerization initiators, those reacting with a group containing an unsaturated bond, an acryloyl group, or a methacryloyl group by heat may be used. Examples of them include organic peroxides such as benzoyl peroxide, methyl ethyl ketone peroxide, methyl isobutyl peroxide, cumene hydroperoxide, t-butyl hydroperoxide, and the like; azo type initiators such as azobisisobutylonitrile and the like; and others. These may be used singly or in a combination of two or more kinds.

As the photo-polymerization initiators, those reacting with a group containing an unsaturated bond, an acryloyl group, or a methacryloyl group by light may be used. Examples of them include acetophenones, benzophenones, benzils, benzoin ethers, benzyl diketals, thioxanthones, acylphosphine oxides, acylphosphinate esters, and the like. These may be used singly or in a combination of two or more kinds.

The amount of the thermal polymerization initiator and/or the photo-polymerization initiator used is preferably 0.01 to 10 parts by mass, and more preferably 0.05 to 5 parts by mass, relative to 100 parts by mass of the adamantyl group containing epoxy-modified (meth)acrylate or the resin mixture (hereinafter they are sometimes referred to as "Resin Component"). By choosing the content of the polymerization initiator within the above range, suitable polymerization characteristics and good physical properties such as optical characteristics and the like may be realized.

In a resin composition of the present invention, many kinds of publicly known additives that have been conventionally used may be blended as appropriate, if necessary. Examples of such additives include a decay-preventing agent, a modifying agent, a silane coupling agent, a defoaming agent, inorganic powders, a solvent, a leveling agent, a mold-release agent, a dye, a pigment, and the like.

Examples of the decay-preventing agents include decay-preventing agents publicly known for years such as a phenol compound, an amine compound, an organic sulfur compound, a phosphorous compound and the like.

Examples of the phenol compounds include commercially available materials such as Irganox 1010 (trademark, manufactured by Ciba Specialty Chemicals Inc.), Irganox 1076 (trademark, manufactured by Ciba Specialty Chemicals Inc.), Irganox 1330 (trademark, manufactured by Ciba Specialty Chemicals Inc.), Irganox 3114 (trademark, manufactured by Ciba Specialty Chemicals Inc.), Irganox 3125 (trademark, manufactured by Ciba Specialty Chemicals Inc.), Irganox 3790 (trademark, manufactured by Ciba Specialty Chemicals Inc.), BHT, Cyanox 1790 (trademark, manufactured by Cyanamid Co.), Sumilizer GA-80 (trademark, manufactured by Sumitomo Chemical Co., Ltd.), and the like.

Examples of the amine compounds include such compounds as Irgastab FSO42 (trademark, manufactured by Ciba Specialty Chemicals Inc.), GENOX EP (trademark, manufactured by Crompton Corporation, chemical name: dialkyl-N-methylamine oxide) and the like; and such hindered amines as ADK STAB LA-52, LA-57, LA-62, LA-63, LA-67, LA-68, LA-77, LA-82, LA-87, and LA-94, all manufactured by Asahi Denka Co., Ltd., Tinuvin 123, 144, 440, 662, Chimassorb 2020, 119, and 944, all manufactured by Ciba Specialty Chemicals Inc., Hostavin N30 manufactured by Hoechst GmbH, Cyasorb UV-3346 and UV-3526, both manufactured by Cytec Industries Inc., Uval 299 manufactured by Great Lakes Chemical Corporation, Sanduvor PR-31 manufactured by Clariant, and the like.

Examples of the organic sulfur compounds include such commercially available products as DSTP (Yoshitomi) (trademark, manufactured by Yoshitomi Pharmaceutical Industries Ltd.), DLTP (Yoshitomi) (trademark, manufactured by Yoshitomi Pharmaceutical Industries Ltd.), DLTOIB (trademark, manufactured by Yoshitomi Pharmaceutical Industries Ltd.), DMTP (Yoshitomi) (trademark, manufactured by Yoshitomi Pharmaceutical Industries., Ltd.), Seenox 412S (trademark, manufactured by Shipro Kasei Kaisha, Ltd.), Cyanox 1212 (trademark, manufactured by Cyanamid Co.) and the like.

Examples of the modifying agents include modifying agents publicly known for years such as glycols, silicones, alcohols and the like. Examples of the silane coupling agents include silane coupling agents publicly known for years such as a silane-type, a titanate-type and the like. Examples of the defoaming agents include defoaming agents publicly known for years such as a silicone type and the like. Examples of the inorganic powders include publicly known inorganic powders such as glass powders, silica powders, titania, zinc oxide, alumina and the like, having a particle diameter of several nm to 10 μm depending on their use. As the solvents for epoxy resin powders and as a diluent solvent for coating, aromatic solvents such as toluene, xylene and the like, and ketone solvents such as methyl ethyl ketone, methyl isobutyl ketone, cyclohexanone and the like may be used.

A resin composition of the present invention, obtained by mixing the resin component, a thermal polymerization initiator and/or a photo-polymerization initiator, and various additives, is charged into a mold (resin mold) or formed to an intended shape by coating, then cured by heating or by light irradiation such as a UV beam and the like. In the case of thermal curing, curing temperature is usually about 30 to about 200° C., and preferably 50 to 150° C. By choosing the temperature at 30° C. or higher, poor curing does not occur, nor does coloring and the like at 200° C. or lower. The curing time is dependent on a resin component, a polymerization initiator, and the like to be used, but preferably 0.5 to 6 hours.

When it is photo-cured by UV irradiation, the irradiation strength of a UV beam is arbitrary as it is determined by the resin component, the kind of the polymerization initiators, the thickness of the film, and the like, but usually about 100 to about 5,000 mJ/cm$^2$, and preferably 500 to 4,000 mJ/cm$^2$.

Heating may be performed after the irradiation of the UV beam, preferably at 70 to 200° C. for 0.5 to 12 hours.

Molding methods may be an injection molding, a blow molding, a press molding and the like, and are not particularly restricted, but an injection molding with a injection molding machine using a resin composition in pellet form may be preferably used.

A cured product obtained by curing the resin composition of the present invention has excellent transparency, heat-resistance, and mechanical properties such as hardness and the like, and may be used suitably as a solder resist for a wiring board, a protection film for a color filter of a liquid crystal display and an image sensor, a color resist, a sealant for an electronic circuit (a sealant for an optical semiconductor and for an organic EL device), an optoelectronic component (an optical waveguide, a lens for an optical communication, an optical film, and the like), an adhesive for them, and the like.

Further, a resin composition of the present invention may be used also for a semiconductor element/an integrated circuit (an IC and the like), an individual semiconductor (a diode, a transistor, a thermistor and the like), an LED (an LED lamp, a chip LED, a light receiving element, a lens for an optical semiconductor), a sensor (a temperature sensor, a light sensor, a magnetic sensor), a passive component (a high frequency device, a resistor, a condenser and the like), a structural component (a connector, a switch, a relay and the like), an automobile part (a circuit system, a control system, sensors, a lamp seal and the like), an adhesive (for an optical component, an optical disk, a pickup lens) and others, and, in addition, for an optical film and the like as surface coating.

EXAMPLES

Next, the present invention will be explained in further detail, but the invention is not restricted at all by these Examples.

Synthesis Example 1

Synthesis of 1,3-bis(4-glycidyloxyphenyl)adamantane

In a separable flask having an inner volume of 300 ml, equipped with a reflux condenser, a stirrer, and a thermometer, were charged 20.0 g (0.06 mol) of 1,3-bis(4-hydroxyphenyl)adamantane, 46 g (0.50 mol) of epichlorohydrin, 30 mL of MIBK, and 60 mL of DMSO, and they were heated to 45° C. Then, 5.5 g (0.14 mol) of sodium hydroxide was added into this solution by small portions during a period of 1.5 hours. After completion of the addition, the reaction temperature was raised to 75° C., and the reaction was carried out for 4 hours. After the reaction was completed, the mixture was cooled to room temperature, added by 25 mL of MIBK, and washed with water until the aqueous layer became neutral. The resulting organic layer was concentrated to obtain pale yellow solids. The pale yellow solids were dissolved in 285 g of MEK, added by 3.4 g of 25% by mass of aqueous sodium hydroxide solution, and then the mixture was stirred for 2 hours under reflux. Thereafter, the solution was cooled to room temperature, and washed by water until the aqueous layer became neutral from alkaline. The water-washing was performed two more times, and then the organic layer was concentrated to obtain pale yellow solids, which was recrystallized by a mixed solvent of THF (tetrahydrofuran) and isopropyl ether to obtain 24.1 g of 1,3-bis(4-glycidyloxyphenyl)adamantane having the following formula (purity of 94% by LC (liquid chromatography), epoxy equivalent of 224).

The 1,3-bis(4-glycidyloxyphenyl)adamantane was identified by nuclear magnetic resonance spectra ($^1$H-NMR and $^{13}$C-NMR). The spectra data are shown in the following. The nuclear magnetic resonance spectra were measured in chloroform-d solvent by JNM-ECA500 manufactured by JEOL Ltd.

$^1$H-NMR(500 MHz): 1.75(s, 2H), 1.90(s, 8H), 1.96(s, 2H), 2.28(s, 2H), 2.72(dd, 2H), 2.87(dd, 2H), 3.32(m, 2H), 3.94 (dd, 2H), 4.17(dd, 2H), 6.87(d, 4H), 7.29(d, 4)

$^{13}$C-NMR(125 MHz): 29.6, 35.8, 36.7, 42.4, 44.7, 49.3, 50.2, 68.8, 114.2, 125.9, 143.5, 156.4

Synthesis Example 2

Synthesis of 1-(2,4-diglycidyloxyphenyl)adamantane

In a separable flask having an inner volume of 300 ml, equipped with a reflux condenser, a stirrer, a thermometer, and a nitrogen inlet were charged 30 mL of MIBK, 60 mL of DMSO, and 65 g (0.70 mol) of epichlorohydrin, and the atmosphere of the system was displaced by nitrogen. Then, 20.6 g (0.09 mol) of 1-(2,4-dihydroxyphenyl)adamantane was added and the mixture was heated to 45° C. with stirring. Then, 7.6 g (0.19 mol) of sodium hydroxide was added into this solution by small portions during a period of 0.5 hour, and the agitation was continued for further 2 hours. Thereafter, the reaction solution was cooled to room temperature, added by 25 mL of MIBK, and washed by water until the aqueous layer became neutral. The resulting organic layer was concentrated to obtain viscous liquid having a pale yellow color. The viscous liquid having a pale yellow color was dissolved in 285 g of MEK, added by 3.4 g of 25% by mass of aqueous sodium hydroxide solution, and then the mixture was stirred for 2 hours under reflux. Thereafter, the solution was cooled to room temperature, and washed by water until the aqueous layer became neutral from alkaline. The water-washing was performed two more times, and then the organic layer was concentrated to obtain 28.3 g of 1-(2,4-diglycidyloxyphenyl) adamantane having the following formula (93% purity by LC, epoxy equivalent of 185).

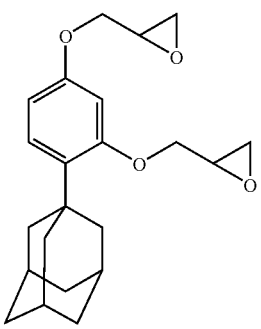

The 1-(2,4-diglycidyloxyphenyl)adamantane was identified by nuclear magnetic resonance spectra ($^1$H-NMR and $^{13}$C-NMR). The spectra data are shown in the following. The nuclear magnetic resonance spectra were measured in DMSO-d$_6$ solvent by JNM-ECA500 manufactured by JEOL Ltd.

$^1$H-NMR(500 MHz): 1.72(s, 6H), 2.02(s, 9H), 2.69(dd, 1H), 2.76(dd, 1H), 2.83(dd, 1H), 2.87(dd, 1H), 3.30(m, 1H), 3.37(m, 1H), 3.80(dd, 1H), 3.87(dd, 1H), 4.26(dd, 1H), 4.32 (dd, 1H), 6.48(dd, 1H), 6.56(d, 1H), 7.02(d, 1H)

$^{13}$C-NMR(125 MHz): 28.4, 35.8, 36.6, 40.4, 43.6, 43.7, 49.7, 49.8, 68.7, 68.9, 100.8, 105.3, 126.5, 130.5, 157.3, 158.0

Synthesis Example 3

Synthesis of 1,3-bis(2,4-diglycidyloxyphenyl)adamantane

In a separable flask having an inner volume of 300 ml, equipped with a reflux condenser, a stirrer, a thermometer, and a nitrogen inlet were charged 30 mL of MIBK, 60 mL of DMSO, and 80 g (0.86 mol) of epichlorohydrin, and the atmosphere of the system was displaced by nitrogen. Then, 20.5 g (0.06 mol) of 1,3-bis(2,4-dihydroxyphenyl)adamantane was added and the mixture was heated to 45° C. with stirring. Then, 12.2 g (0.30 mol) of sodium hydroxide was added into this solution by small portions during a period of 0.5 hour, and the agitation was continued for further 2 hours. The reaction solution was cooled to room temperature, added by 25 mL of MIBK, and washed by water until the aqueous layer became neutral. The resulting organic layer was concentrated to obtain viscous liquid having a pale yellow color. The viscous liquid having a pale yellow color was dissolved in 285 g of MEK, added by 3.4 g of 25% by mass of aqueous sodium hydroxide solution, and then the mixture was stirred for 2 hours under reflux. Thereafter, the solution was cooled to room temperature, and washed by water until the aqueous layer became neutral from alkaline. The water-washing was performed two more times, and then the organic layer was concentrated to obtain 24.1 g of 1,3-bis(2,4-diglycidyloxyphenyl)adamantane having the following formula (84% purity by LC, epoxy equivalent of 164).

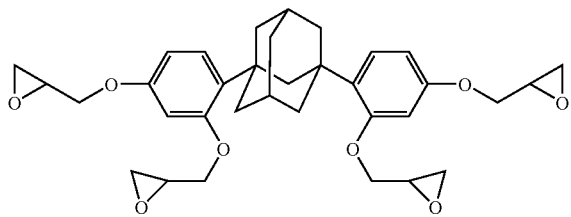

The 1,3-bis(2,4-diglycidyloxyphenyl)adamantane was identified by nuclear magnetic resonance spectra ($^1$H-NMR and $^{13}$C-NMR). The spectra data are shown in the following. The nuclear magnetic resonance spectra were measured in DMSO-d$_6$ solvent by JNM-ECA500 manufactured by JEOL Ltd.

$^1$H-NMR(500 MHz): 1.73(s, 2H), 1.98(br, 4H), 2.11(br, 6H), 2.30(s, 2H), 2.70(m, 4H), 2.82(m, 4H), 3.31(m, 4H), 3.84(m, 4H), 4.29(m, 4H), 6.49(dd, 2H), 6.60(d, 2H), 7.08(d, 2H)

$^{13}$C-NMR(125 MHz): 29.7, 36.5, 37.4, 40.4, 44.2, 44.3, 44.7, 50.3, 50.4, 69.3, 69.5, 101.5, 106.0, 127.2, 131.1, 157.9, 158.7

Synthesis Example 4

Synthesis of 2,2-bis(4-glycidyloxyphenyl)adamantane

In a separable flask having an inner volume of 300 ml, equipped with a reflux condenser, a stirrer, and a thermometer were charged 20.0 g (0.06 mol) of 2,2-bis(4-hydroxyphenyl) adamantane, 46 g (0.50 mol) of epichlorohydrin, 30 mL of MIBK, and 60 mL of DMSO, and the mixture was heated to 45° C. Then, 5.5 g (0.14 mol) of sodium hydroxide was added into this solution by small portions during a period of 1.5 hours. After completion of the addition, the reaction temperature was raised to 75° C., and the reaction was carried out for 4 hours. After the reaction was completed, the reaction solution was cooled to room temperature, added by 25 mL of MIBK, and washed by water until the aqueous layer became neutral. The resulting organic layer was concentrated to obtain pale yellow solids. The pale yellow solids were dissolved in 285 g of MEK, added by 3.4 g of 25% by mass of aqueous sodium hydroxide solution, and then the mixture was stirred for 2 hours under reflux. Thereafter, the solution was cooled to room temperature, and washed by water until the aqueous layer became neutral from alkaline. The water-washing was performed two more times, and then the organic layer was concentrated. The resulting pale yellow solids were recrystallized by a mixed solvent of THF and isopropyl ether to obtain 23.2 g of 2,2-bis(4-glycidyloxyphenyl)adamantane having the following formula (96% purity by LC, epoxy equivalent of 224).

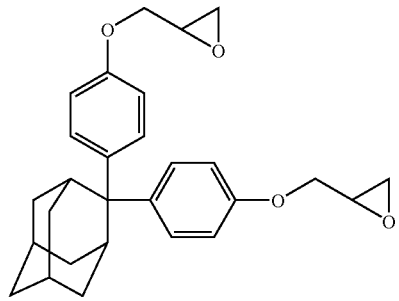

The 2,2-bis(4-glycidyloxyphenyl)adamantane was identified by nuclear magnetic resonance spectra ($^1$H-NMR and $^{13}$C-NMR). The spectra data are shown in the following. The nuclear magnetic resonance spectra were measured in chloroform-d solvent by JNM-ECA500 manufactured by JEOL Ltd.

$^1$H-NMR(500 MHz): 1.70(s, 6H), 1.79(s, 2H), 2.00(d, 2H), 2.67(dd, 2H), 2.83(dd, 2H), 3.16(s, 2H), 3.27(m, 2H), 3.86 (dd, 2H), 4.07(dd, 2H), 6.77(d, 4H), 7.27(d, 4H)

$^{13}$C-NMR(125 MHz): 27.5, 32.1, 33.3, 38.0, 44.8, 49.4, 50.1, 68.6, 114.5, 126.7, 141.5, 155.5

Synthesis Example 5

Synthesis of 2,2-bis(4-glycidyloxy-3,5-dimethylphenyl)adamantane

In a separable flask having an inner volume of 500 ml, equipped with a reflux condenser, a stirrer, and a thermometer were charged 50.2 g (0.13 mol) of 2,2-bis(4-hydroxy-3,5-dimethylphenyl)adamantane, 99.6 g (1.06 mol) of epichlorohydrin, 75 mL of MIBK, and 150 mL of DMSO, and the mixture was heated to 45° C. Then, 13.2 g (0.33 mol) of sodium hydroxide was added into this solution by small portions during a period of 1.0 hour. Then, the reaction temperature was raised to 65° C., and the reaction was carried out for 2 hours. After completion of the reaction, the reaction solution was cooled to room temperature, added by 250 mL of MIBK, and washed by water until the aqueous layer became neutral. The resulting organic layer was concentrated to obtain a crude product as pale yellowish viscous liquid. After the crude product was dissolved in 70 mL of THF, the resulting solution was added drop-wisely into 350 mL of methanol to precipitate solids, which were collected by filtration and dried to obtain 60.5 g of 2,2-bis(4-glycidyloxy-3,5-dimethylphenyl)adamantane having the following formula (94% purity by LC, epoxy equivalent of 259).

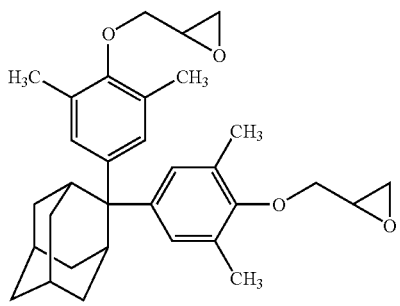

The 2,2-bis(4-glycidyloxy-3,5-dimethylphenyl)adamantane was identified by nuclear magnetic resonance spectra ($^1$H-NMR and $^{13}$C-NMR). The spectra data are shown in the following. The nuclear magnetic resonance spectra were measured in chloroform-d solvent by JNM-ECA500 manufactured by JEOL Ltd.

$^1$H-NMR(500 MHz): 1.64-1.69(m, 6H), 1.76(s, 2H), 1.99 (d, 4H), 2.21(s, 12H), 2.66(dd, 2H), 2.84(t, 2H), 3.11(s, 2H), 3.29-3.32(m, 2H), 3.69(dd, 2H), 3.95(dd, 2H), 7.00(s, 4H)

$^{13}$C-NMR(127 MHz): 16.8, 27.6, 32.1, 33.5, 38.2, 44.7, 49.4, 50.8, 72.9, 126.4, 130.1, 144.0, 152.6

Example 1

Synthesis of an Adamantyl Group Containing Epoxy-modified Acrylate

In a separable flask having an inner volume of 300 ml, equipped with a reflux condenser, a stirrer, a thermometer, and an air inlet were charged 22.4 g of 1,3-bis(4-glycidyloxyphenyl)adamantane obtained by the Synthesis Example 1, 7.6 g of acrylic acid, 20 mL of MIBK, 0.76 g of tetraethylammonium bromide, and 7.6 mg of p-methoxyphenol, and the mixture was heated to 120° C. with flowing a small amount of an air, and stirred for 20 hours. Thereafter, 80 mL of MIBK was added, and the reaction solution was cooled to room temperature. The MIBK solution was washed by 5% by mass of aqueous sodium chloride solution twice, and by pure water once, and then the organic layer was concentrated to obtain 26.8 g of the adamantyl group containing epoxy-modified acrylate having the following formula (purity of 91% by LC).

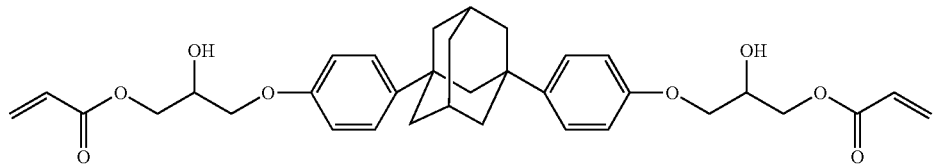

The epoxy-modified acrylate was identified by nuclear magnetic resonance spectra ($^1$H-NMR and $^{13}$C-NMR). The spectra data are shown in the following. The nuclear magnetic resonance spectra were measured in chloroform-d solvent by JNM-ECA500 manufactured by JEOL Ltd.

$^1$H-NMR(500 MHz): 1.75(s, 2H), 1.89(s, 8H), 1.95(s, 2H), 4.0-4.44(10H), 5.85(d, 2H), 6.16(dd, 2H), 6.42(d, 2H), 6.86 (d, 4H), 7.29(d, 4H)

$^{13}$C-NMR(125 MHz): 29.5, 35.8, 36.7, 42.4, 49.3, 65.5, 68.5, 68.7, 114.2, 125.9, 127.9, 131.5, 143.6, 156.3, 166.3

Example 2

Synthesis of an Adamantyl Group Containing Epoxy-modified Acrylate

In a separable flask having an inner volume of 300 ml, equipped with a reflux condenser, a stirrer, a thermometer, and an air inlet were charged 18.5 g of 1-(2,4-diglycidyloxyphenyl)adamantane obtained by the Synthesis Example 2, 7.9 g of acrylic acid, 50 mL of toluene, 0.79 g of tetraethylammonium bromide, and 7.9 mg of p-methoxyphenol, and the mixture was heated to 120° C. with flowing a small amount of an air, and stirred for 10 hours. Thereafter, 80 mL of toluene was added, and the reaction solution was cooled to room temperature. The toluene solution was washed by 5% by mass of aqueous sodium chloride solution twice, and by pure water once, and then the organic layer was concentrated to obtain 24.1 g of the adamantyl group containing epoxy-modified acrylate having the following formula (purity of 87% by LC).

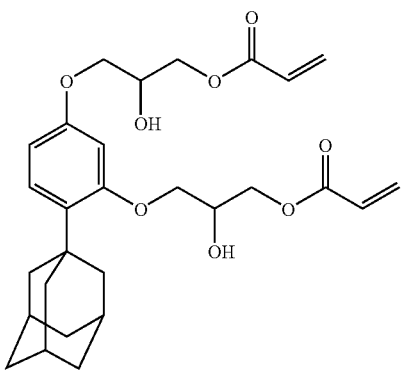

The epoxy-modified acrylate was identified by nuclear magnetic resonance spectra ($^1$H-NMR and $^{13}$C-NMR). The spectra data are shown in the following. The nuclear magnetic resonance spectra were measured in chloroform-d solvent by JNM-ECA500 manufactured by JEOL Ltd.

$^{1}$H-NMR(500 MHz): 1.74(s, 6H), 2.05(s, 9H), 3.97-4.48 (10H), 5.85(d,H), 5.87(d, 1H), 6.14(dd, 1H), 6.18(dd, 1H), 6.43-6.50(m, 4H), 7.16(d, 1H)

$^{13}$C-NMR(125 MHz): 29.0, 36.5, 37.1, 40.8, 41.1, 65.5, 65.8, 68.3, 68.5, 68.7, 68.8, 100.9, 105.0, 127.3, 127.8, 127.9, 131.7, 131.8, 131.9, 157.4, 158.2, 166.0, 166.3

Example 3

Synthesis of an Adamantyl Group Containing Epoxy-modified Acrylate

In a separable flask having an inner volume of 300 ml, equipped with a reflux condenser, a stirrer, a thermometer, and an air inlet were charged 16.4 g of 1,3-bis(2,4-diglycidyloxyphenyl)adamantane obtained by the Synthesis Example 3, 7.9 g of acrylic acid, 50 mL of toluene, 0.79 g of tetraethylammonium bromide, and 7.9 mg of p-methoxyphenol, and the mixture was heated to 120° C. with flowing a small amount of an air, and stirred for 12 hours. Thereafter, 80 mL of toluene was added, and the reaction solution was cooled to room temperature. The toluene solution was washed by 5% by mass of aqueous sodium chloride solution twice, and by pure water once, and the organic layer was concentrated to obtain 14.8 g of the adamantyl group containing epoxy-modified acrylate having the following formula (purity of 87% by LC).

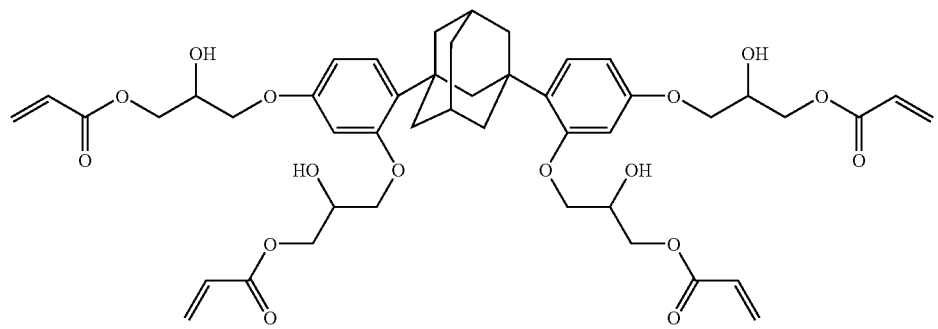

The epoxy-modified acrylate was identified by nuclear magnetic resonance spectra ($^{1}$H-NMR and $^{13}$C-NMR). The spectra data are shown in the following. The nuclear magnetic resonance spectra were measured in chloroform-d solvent by JNM-ECA500 manufactured by JEOL Ltd.

$^{1}$H-NMR(500 MHz): 1.75(s, 2H), 2.00-2.22(m, 10H), 2.33 (s, 2H), 3.90-4.45(20H), 5.86(d, 4H), 6.15(dd, 4H), 6.41-6.53 (m, 8H), 7.15(d, 2H)

$^{13}$C-NMR(125 MHz): 29.6, 36.4, 40.5, 44.9, 65.5, 65.8, 68.5, 68.7, 68.8, 68.9, 101.1, 105.1, 127.2, 127.8, 127.9, 131.7, 131.8, 131.9, 157, 157.5, 158.2, 166.2, 166.3

Example 4

Synthesis of an Adamantyl Group Containing Epoxy-modified Acrylate

In a separable flask having an inner volume of 300 ml, equipped with a reflux condenser, a stirrer, a thermometer, and an air inlet were charged 22.4 g of 2,2-bis(4-glycidyloxyphenyl)adamantane obtained by the Synthesis Example 4, 7.9 g of acrylic acid, 50 mL of toluene, 0.79 g of tetraethylammonium bromide, and 7.9 mg of p-methoxyphenol, and the mixture was heated to 120° C. with flowing a small amount of an air, and stirred for 20 hours. Thereafter, 80 mL of toluene was added, and the reaction solution was cooled to room temperature. The toluene solution was washed by 5% by mass of aqueous sodium chloride solution twice, and by pure water once, and then the organic layer was concentrated to obtain 26.3 g of the adamantyl group containing epoxy-modified acrylate having the following formula (purity of 93% by LC).

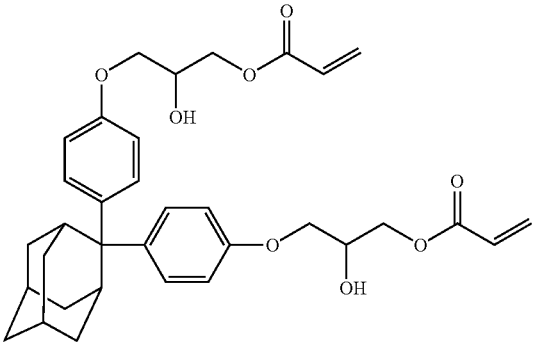

The epoxy-modified acrylate was identified by nuclear magnetic resonance spectra ($^{1}$H-NMR and $^{13}$C-NMR). The spectra data are shown in the following. The nuclear magnetic resonance spectra were measured in chloroform-d solvent by JNM-ECA500 manufactured by JEOL Ltd.

$^{1}$H-NMR(500 MHz): 1.71(s, 6H), 1.80(s, 2H), 2.01(d, 2H), 3.16(s, 2H), 3.86-4.41(10H), 5.82(d, 2H), 6.12(dd, 2H), 6.41 (d, 2H), 6.76(d, 4H), 7.28(d, 4H)

$^{13}$C-NMR(125 MHz): 27.5, 32.0, 33.3, 38.0, 49.4, 65.4, 68.4, 68.5, 114.5, 126.7, 127.9, 131.6, 141.7, 155.3, 166.2

Example 5

Synthesis of an Adamantyl Group Containing Epoxy-modified Acrylate

In a separable flask having an inner volume of 300 ml, equipped with a reflux condenser, a stirrer, a thermometer, and an air inlet were charged 25.9 g of 2,2-bis(4-glycidyloxy-3,5-dimethylphenyl)adamantane obtained by the Synthesis Example 5, 7.9 g of acrylic acid, 50 mL of toluene, 0.79 g of tetraethylammonium bromide, and 7.9 mg of p-methoxyphenol, and the mixture was heated to 120° C. with flowing a small amount of an air, and stirred for 20 hours. Thereafter, 80 mL of toluene was added, and the reaction solution was cooled to room temperature. The toluene solution was washed by 5% by mass of aqueous sodium chloride solution twice, and by pure water once, and then the organic layer was concentrated to obtain 30.3 g of the adamantyl group containing epoxy-modified acrylate having the following formula (purity of 93% by LC).

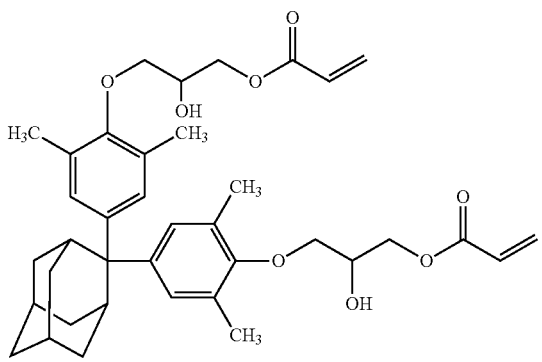

The epoxy-modified acrylate was identified by nuclear magnetic resonance spectra ($^1$H-NMR and $^{13}$C-NMR). The spectra data are shown in the following. The nuclear magnetic resonance spectra were measured in chloroform-d solvent by JNM-ECA500 manufactured by JEOL Ltd.

$^1$H-NMR(500 MHz): 1.64-1.68 (m, 6H), 1.77(s, 2H), 2.00 (d, 4H), 2.19(s, 12H), 3.11(s, 2H), 3.73-4.42(m, 10H), 5.80(d, 2H), 6.12(dd, 2H), 6.39(d, 2H), 6.98(s, 4H)

$^{13}$C-NMR(127 MHz): 16.6, 27.5, 32.0, 33.4, 38.1, 49.4, 65.3, 69.1, 72.0, 126.4, 127.9, 129.9, 131.4, 144.1, 151.9, 166.2

Example 6

A resin composition was prepared by mixing 30 parts by mass of the adamantyl group containing epoxy-modified acrylate obtained by Example 1, 0.03 part by mass of benzoin isobutyl ether, and 70 parts by mass of propyleneglycol monomethyl ether acetate as the solvent. The resin composition was coated on a glass substrate in such a way as to give 100 am of the film thickness after drying of the solvent, and then the solvent was removed by drying. It was irradiated with a UV light by a mercury lamp with the irradiation strength of 1,000 mJ/cm$^2$ to obtain a cured product. The product thus obtained was evaluated by the following methods. The evaluation results are shown in Table 1.

(1) Glass Transition Temperature

By using a differential scanning calorimeter (DSC-7, manufactured by PerkinElmer, Inc.), 10 mg of a sample was kept at 50° C. for 5 minutes under nitrogen atmosphere and then heated at the rate of 10° C./minute. A discontinuous point observed in the thermal flux curve thus obtained was taken as a glass transition temperature Tg.

(2) Light Beam Transmittance

A sample adhered onto the glass substrate was measured in accordance with JIS K7105 at the measurement wave length of 400 nm. A spectrophotometer UV-3100S, manufactured by Shimadzu Corporation, was used as the measuring instrument.

(3) Light Resistance Measurement

By using Suntest CPS+, manufactured by Toyo Seiki Seisaku-Sho, Ltd., a sample adhered onto the glass substrate was irradiated by light at 60° C. for 500 hours, and the change of the light beam transmittance at 400 nm before and after the irradiation was measured by using a sunshine tester. When the decrease rate of the light transmittance after the irradiation test was less than 20%, it was rated as "good", and when it was 20% or more, it was rated as "poor".

(4) Long-Term Heat Resistance Test

By using a sample adhered onto the glass substrate, the change of the light transmittance at 400 nm before and after the test in a controlled temperature oven at 140° C. for 100 hours was measured by a sunshine tester. When the decrease rate of the light transmittance after the heating test was less than 20%, it was rated as "good", and when it was 20% or more, it was rated as "poor".

Example 7

A cured product was produced in a similar manner to that in Example 6 except that the adamantyl group containing epoxy-modified acrylate obtained by Example 2 was used instead of the adamantyl group containing epoxy-modified acrylate obtained by Example 1, and the evaluation was made similarly. The evaluation results are shown in Table 1.

Example 8

A cured product was produced in a similar manner to that in Example 6 except that the adamantyl group containing epoxy-modified acrylate obtained by Example 3 was used instead of the adamantyl group containing epoxy-modified acrylate obtained by Example 1, and the evaluation was made similarly. The evaluation results are shown in Table 1.

Example 9

A cured product was produced in a similar manner to that in Example 6 except that the adamantyl group containing epoxy-modified acrylate obtained by Example 4 was used instead of the adamantyl group containing epoxy-modified acrylate obtained by Example 1, and the evaluation was made similarly. The evaluation results are shown in Table 1.

Example 10

A cured product was produced in a similar manner to that in Example 6 except that the adamantyl group containing epoxy-modified acrylate obtained by Example 5 was used instead of the adamantyl group containing epoxy-modified acrylate obtained by Example 1, and the evaluation was made similarly. The evaluation results are shown in Table 1.

Comparative Example 1

In a separable flask having an inner volume of 300 ml, equipped with a reflux condenser, a stirrer, a thermometer, and an air inlet were charged 18.6 g of bisphenol A epoxy resin (Epikote 828, manufactured by Japan Epoxy Resins Co., Ltd.), 7.9 g of acrylic acid, 50 mL of toluene, 0.79 g of tetraethylammonium bromide, and 7.9 mg of p-methoxyphenol, and the mixture was heated to 120° C. with flowing a small amount of an air, and stirred for 20 hours. Thereafter, 80 mL of toluene was added, and the reaction solution was cooled to room temperature. The toluene solution was washed by 5% by mass of aqueous sodium chloride solution twice, and by pure water once, and then the organic layer was concentrated to obtain 24.5 g of the bisphenol A epoxy resin-modified acrylate (purity of 93% by LC).

A cured product was produced in a similar manner to that in Example 6 except that the bisphenol A epoxy resin-modified acrylate was used instead of the adamantyl group containing epoxy-modified acrylate obtained by Example 1, and the evaluation was made similarly. The evaluation results are shown in Table 1.

TABLE 1

| | Example 6 | Example 7 | Example 8 | Example 9 | Example 10 | Comparative Example 1 |
|---|---|---|---|---|---|---|
| Glass transition temperature (° C.) | 143 | 151 | 186 | 165 | 161 | 128 |
| Light beam transmittance (%) | 91 | 93 | 90 | 91 | 91 | 87 |
| Light resistance | Good | Good | Good | Good | Good | Poor |
| Heat resistance | Good | Good | Good | Good | Good | Good |

INDUSTRIAL APPLICABILITY

An adamantyl group containing epoxy-modified (meth)acrylate and a resin composition containing it in the present invention give a cured product having excellent transparency, optical characteristics such as (durable) light resistance and the like, (durable) heat resistance, and mechanical properties, which is suitable as a solder resist for a wiring board, a protection film for a color filter of a liquid crystal display and an image sensor, a color resist, a sealant for an electronic circuit (a sealant for an optical semiconductor and for an organic EL device), an optoelectronic component (an optical waveguide, a lens for an optical communication, an optical film, and the like), an adhesive for them, and the like.

The invention claimed is:

1. An adamantyl group containing epoxy-modified (meth)acrylate represented by general formula (I):

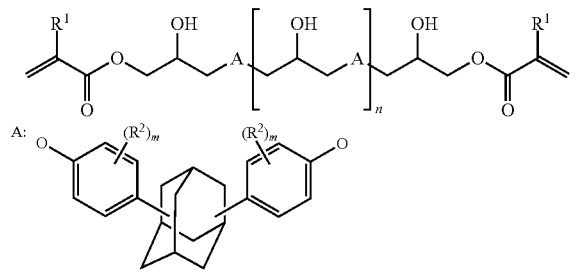

(I)

wherein
  $R^1$ represents a hydrogen atom or a methyl group,
  $R^2$ represents a halogen atom or an aliphatic hydrocarbon group which may contain a hetero atom;
  plural $R^2$ may be the same or different; and
  m represents an integer of 0 to 4 and
  n represents an integer of 0 or more.

2. A method for producing an adamantyl group containing epoxy-modified (meth)acrylate represented by general formula (I), comprising reacting an adamantyl group containing epoxy compound represented by general formula (IV) and (meth)acrylic acid:

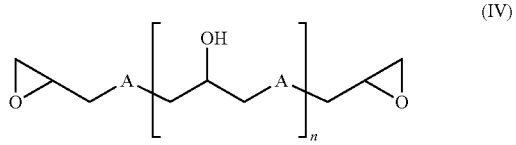

(IV)

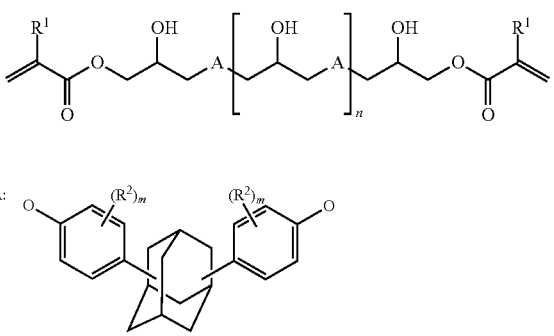

(I)

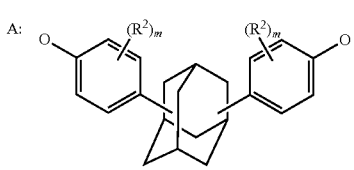

wherein
  $R^1$ represents a hydrogen atom or a methyl group,
  $R^2$ represents a halogen atom or an aliphatic hydrocarbon group which may contain a hetero atom;
  plural $R^2$ may be the same or different; and
  m represents an integer of 0 to 4 and
  n represents an integer of 0 or more.

3. A resin composition comprising the adamantyl group containing epoxy-modified (meth)acrylate according to claim 1.

4. The adamantyl group containing epoxy-modified (meth)acrylate according to claim 1, wherein $R^2$ is a halogen atom selected from the group consisting of fluorine, chlorine, bromine and iodine.

5. The adamantyl group containing epoxy-modified (meth)acrylate according to claim 1, wherein $R^2$ is an aliphatic hydrocarbon group which may contain a hetero atom selected from the group consisting of a methyl group, an ethyl group, a butyl group, a t-butyl group, a cyclohexyl group, a methoxy group, an ethoxy group, a buthoxy group, a hydroxymethyl group, a hydoxyethyl group, a methylthio group, an ethylthio group, a methylamino group, a dimethylamino group, an ethylamino group, and a diethylamino group.

6. The method according to claim 2, wherein said adamantyl group containing epoxy compound represented by general formula (IV) is at least one member selected from the group consisting of 1,3-bis(4-glycidyloxyphenyl)adamantine; 1,3-bis(4-glycidyloxy-3-methylphenyl)adamantine; 1,3-bis(4-glycidyloxy-3,5-dimethylphenyl)adamantine; 2,2-bis(4-glycidyloxyphenyl)adamantine; 2,2-bis(4-glycidyloxy-3-methylphenyl)adamantine; and 2,2-bis(4-glycidyloxy-3,5-dimethylphenyl)adamantine.

7. The method according to claim 2, which is carried out in the presence of a catalyst.

8. The method according to claim 7, wherein said catalyst is at least one member selected from the group consisting of triethylamine, tributylamine, pyridine, dimethylaminopyridine, tetramethylammonium chloride, tetramethylammonium bromide, tetraethylammonium chloride, tetraethylammonium bromide, and triphenylphospine.

9. The method according to claim 2, which is carried out at a temperature of about 50 to about 200° C.

10. The method according to claim 2, which is carried out at a temperature of 70 to 150° C.

11. The method according to claim 2, which is carried out at a pressure of about 0.01 to about 10 MPa.

12. The method according to claim 2, which is carried out at a pressure of normal pressure to 1 MPa.

* * * * *